United States Patent
Heyworth

[15] 3,678,981
[45] July 25, 1972

[54] FASTENER INSERT HAVING A REPLACEABLE NUT

[72] Inventor: Ernest Heyworth, Fullerton, Calif.
[73] Assignee: Tridair Industries, Redondo Beach, Calif.
[22] Filed: Oct. 5, 1970
[21] Appl. No.: 78,066

[52] U.S. Cl. .................................................. 151/41.76
[51] Int. Cl. .................................................. F16b 39/02
[58] Field of Search .................. 151/41.76, 41.7, 41.73; 285/86

[56] References Cited

UNITED STATES PATENTS

| | | |
|---|---|---|
| 3,508,592 | 4/1970 | Rosan, Sr. et al. ................ 151/41.7 |
| 3,219,088 | 11/1965 | Zahodiakin ...................... 151/41.76 |
| 1,113,556 | 10/1914 | Hill ................................... 285/86 |
| 3,233,645 | 2/1966 | Neuschotz ...................... 151/41.73 |
| 3,434,261 | 3/1969 | Rohe ............................... 151/41.76 |

Primary Examiner—Edward C. Allen
Attorney—Arthur W. Fuzak and Thomas A. Seeman

[57] ABSTRACT

A fastener insert for a carrier part where the insert provides a "floating" characteristic for an easily replaceable internal nut so that the nut is self-adjusting; for example, to compensate for the misalignment of parts.

1 Claim, 9 Drawing Figures

Patented July 25, 1972
3,678,981
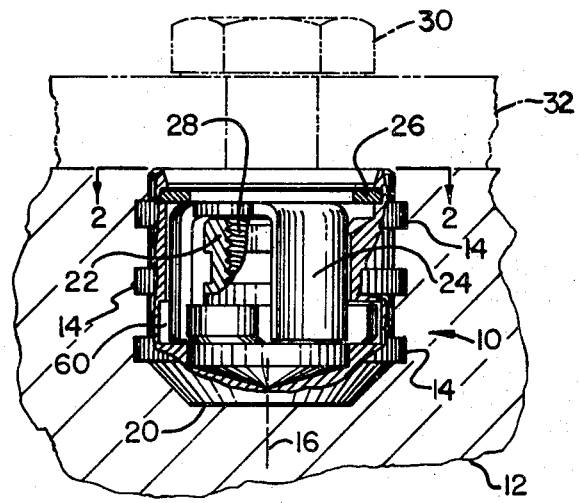
FIG 1
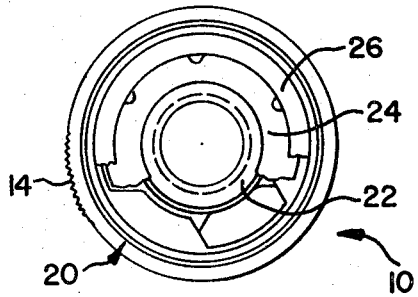
FIG 2
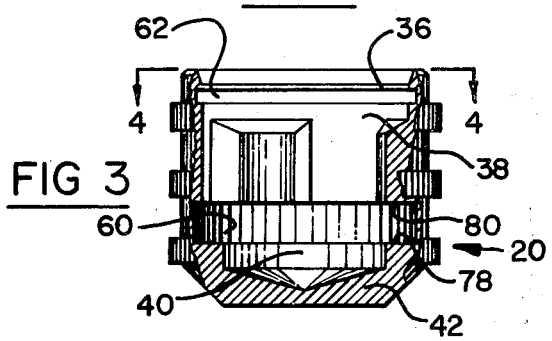
FIG 3
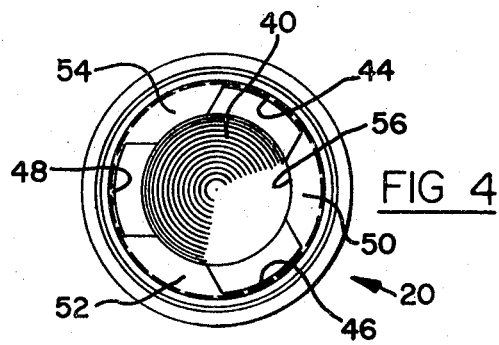
FIG 4
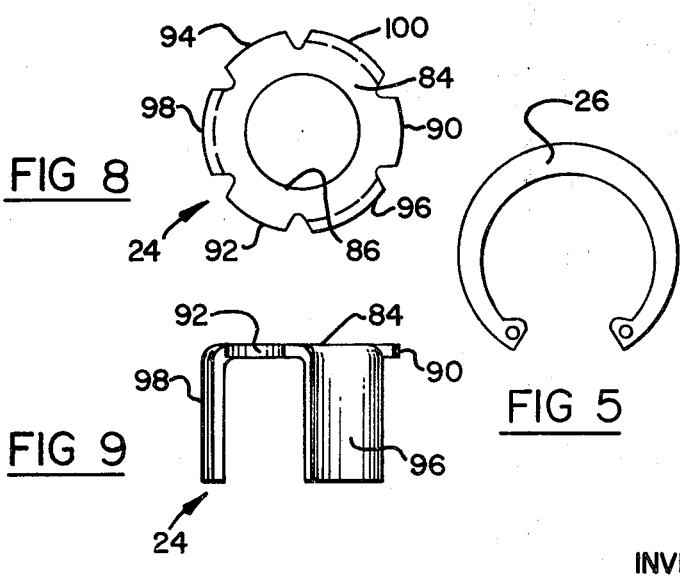
FIG 8  FIG 5  FIG 9
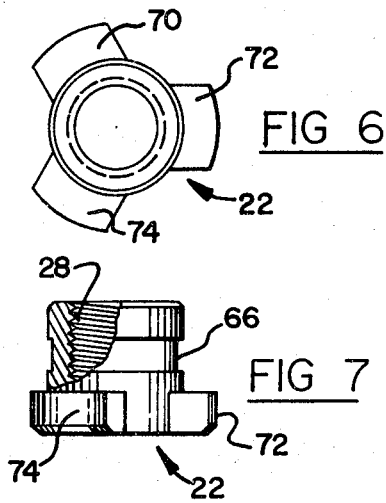
FIG 6
FIG 7
INVENTOR:
ERNEST HEYWORTH
BY: Donald J. Ellingsberg

FASTENER INSERT HAVING A REPLACEABLE NUT

BACKGROUND OF THE INVENTION

Fastener inserts provide strong, wear-resistant threads in a carrier part which is generally formed from relatively soft material and, therefore, physically unsuited for the direct and secure anchorage of fasteners such as bolts, studs, and the like. Such inserts are of several types and are secured in fixed relation to the carrier part by several methods. For example, an insert can be screwed into a threaded bore in the carrier part and locked in position by one or more locking keys (see U.S. Pat. No. 2,855,970). Other inserts are embedded by casting the material of the carrier part or a material compatible therewith about the insert (see U.S. Pat. No. 3,130,765).

It is frequently difficult to position the fastener insert accurately within the carrier part so that the insert is precisely aligned with an opening in another part through which a fastener passes. Fastener inserts have been developed with an internal nut that is free to float for a predetermined lateral or transverse distance within a housing and align with the coacting fastener (see U.S. Pat. No. 3,130,765).

When a fastener is threaded into a fastener insert, it is possible for the strong threads of the insert to become damaged. Fastener inserts were developed that facilitate the removal and replacement of the internal threads of the fastener insert without physical damage to the carrier part (see U.S. Pat. No. 3,468,358).

However, the desirable floating characteristic of the nut, as previously described, is not provided by the fastener insert having replaceable internal threads. The thread form and thread engagement between the outer sleeve or housing and the inner replaceable liner or nut limits the degree of float and is inherently self-centering under tension loading about the main axis of the fastener insert. Thus, the coacting housing and nut continuously seek a central position of alignment.

Further, these fastener inserts have a singular locking key to resist rotation of the nut within the housing when a coacting fastener is inserted or removed. Although some fastener inserts do provide a floating nut that is retained within the housing by a retainer having a plurality of segments, each of which correspond to the singular locking key (see U.S. Pat. No. 3,508,592), increased effort is required to remove the installed retainer so that the floating nut can be replaced; although it is noted that such removal and replacement has not been contemplated.

OBJECTS OF THE INVENTION

Accordingly, it is an object of the invention to provide a new and improved fastener insert having a replaceable floating nut.

It is an object of the invention to provide a fastener insert having a replaceable floating nut that accepts a predetermined amount of movement yet resists movement in excess of such predetermined amounts or values.

SUMMARY OF THE INVENTION

Briefly, in accordance with the invention, a fastener insert is provided having a housing that is connected to a carrier part. The housing has an axially extending keyway slot intersecting a laterally extending raceway, and further has an internal nut with a tab that slidably engages the keyway slot when the nut is inserted into the housing and enters the raceway when the nut is moved to clear the intersection of the keyway slot and raceway. A key or retainer removably positioned in the housing obstructs the intersection so that removal of the nut from the housing is prevented.

While the specification concludes with claims particularly pointing out and distinctly claiming the subject matter which may be regarded as the invention, the organization and method of operation, together with further objects, features, and the attending advantages thereof, may best be understood when the following description is read in connection with the accompanying drawing.

BRIEF DESCRIPTION OF THE DRAWING

FIG. 1 is an elevation view, partly sectional and partly broken away, of the fastener insert of the invention.

FIG. 2 is a plan view, partly broken away, of the fastener insert of FIG. 1 along the line 2—2.

FIG. 3 is an elevation view, partly sectional, of the housing of the fastener insert of FIG. 1.

FIG. 4 is a plan view of the housing of FIG. 3 along the line 4—4.

FIG. 5 is a plan view of the retaining ring for the fastener insert of FIG. 1.

FIG. 6 is a plan view of the nut for the fastener insert of FIG. 1.

FIG. 7 is an elevation view, partly sectional, of the nut of FIG. 6.

FIG. 8 is a plan view of the retainer for the fastener insert of FIG. 1.

FIG. 9 is an elevation view of the retainer of FIG. 8.

DESCRIPTION OF THE INVENTION

Referring to the drawing and to FIG. 1, a fastener insert 10 formed in accordance with the invention is adapted to be connected to a carrier part 12. The carrier part 12 can be formed from a metal such as aluminum, or a plastic material, or any other material in which it may be desirable to connect a fastener insert 10. Although it is possible to thread a fastener insert into a tapped bore in a carrier part, the fastener insert 10 of the invention is illustrated as cast into the carrier part 12. Outwardly extending ribs 14, which preferably have knurled surfaces to "bite" into the carrier part material, not only resist rotation of the fastener insert 10 within the carrier part 12 but also resist pull-out or movement of the carrier part in an axial direction relative to axis 16 as defined by the fastener insert.

The fastener insert 10, as particularly shown by FIG. 1 and 2, has a housing 20 that receives a nut 22 and a retainer 24 which are secured as an assembly within the housing by a retainer ring 26. Nut 22 has internal threads 28 to engage a fastener such as threaded bolt 30 (shown in phantom by FIG. 1) that fastens part 32 (also shown in phantom) to carrier part 12.

The housing 20, as particularly shown by FIGS. 3 and 4, has a housing opening 36 that exposes an inner housing wall 38. Housing or chamber wall 38 develops an inner chamber 40 formed with a closed end 42. Housing 20 is preferably cast and/or machined with closed end 42; however, it is contemplated that a dome-shaped cap could be used to close a cylindrical housing such as is taught by U.S. Pat. No. 2,742,938.

Chamber wall 38 has longitudinally extending grooves or keyway slots 44, 46 and 48 that are spaced apart, preferably equally spaced, and develop inwardly extending land portions 50, 52 and 54 that can have similar concave faces 56. Chamber wall 38 further has a laterally, i.e., outwardly, extending groove or projection raceway 60 adjacent the closed end 42 that intersects each of the keyway slots 44, 46 and 48, and that undercuts the land portions 50, 52 and 54.

A laterally extending groove 62 adjacent the opening 36 receives the selectively removable and conventional retaining ring 26 which is shown more particularly by FIG. 5.

Referring to FIGS. 6 and 7, nut 22 has internal threads 28 that engage a fastener as previously described and illustrated by FIG. 1. Nut 22 can have a relieved area 66 which is conventional and functions to lock a fastener threaded into the nut. Nut 22 has outwardly extending projections or tabs 70, 72 and 74 spaced apart and sized to slide in an axial or longitudinal direction within the respective keyway slots 44, 46 and 48. When the tabs 70, 72 and 74 impinge upon the lower sidewall 78 of projection raceway 60 (see FIG. 3), the tabs are coincidental with the raceway 60 and can be moved into the raceway. The tabs 70, 72 and 74 have a width no greater than the width of the associated land portions 50, 52 and 54 so that the respective tabs can be inserted from the keyway slots into a covered relationship by the discontinuous upper sidewall 80 within the raceway 24.

Retainer 24, as particularly shown by FIGS. 8 and 9, has an annular plate portion 84 with a central opening 86 and tab portions 90, 92 and 94. Interposed between adjacent tab portions are depending leg segments 96, 98 and 100. Each segment is sized for axial insertion into its associated keyway slot; for example, segments 96, 98 and 100 into slots 44, 46 and 48, respectively. When the fastener insert 10 of the invention is assembled as described hereinafter, the length of the depending segments is sufficient so that the segments rest upon the lower sidewall 78 of projection raceway 60 (see FIG. 3) while the segments and plate portion generally envelop nut 22. The tab portions 90, 92 and 94 terminate at the major dimension of the plate portion and facilitate the accurate and rapid positioning of the retainer within the housing relative to the axis 16 thereof.

The fastener insert 10 of the invention as illustrated, is assembled by first positioning the nut 22 within the housing 20 with the tabs 70, 72 and 74 sliding axially along the keyway slots 44, 46 and 48 until coincident with the projection raceway 60. The nut is then rotated generally about axis 16 until the tabs have fully entered the projection raceway and are clear of the keyway slots. The retainer 24 is then positioned within the housing by inserting the leg segments 96, 98 and 100 axially into the keyway slots until the segments enter the intersection regions of the keyway slots and the projection raceway thereby blocking the tabs 70, 72 and 74 into a covered relationship with the land portions 50, 52 and 54. The retaining ring 26 is then compressed to pass through housing opening 36, and permitted to expand and snap into a locking engagement within lateral groove 62. The retaining ring experiences no axial loads when a fastener, such as fastener 30, is threaded into the nut since all axial or pull-out loads are transmitted through the nut tabs 70, 72 and 74 to the housing land portions 50, 52 and 54 and finally to the carrier part 12 through the housing ribs 14.

The width of the nut tabs 70, 72 and 74 is less than the width of the land portions 50, 52 and 54 and the thickness of the tabs is less than the width of projection raceway 60 so that the nut 22 can move within the raceway through a predetermined degree of "float." The nut 22, therefore, is self-adjusting within the housing 20 when, for example, there is a misalignment between a matching bore in part 32 (see FIG. 1) and the fastener insert 10 of the invention.

As will be evidenced from the foregoing description certain aspects of the invention are not limited to the particular details of construction as illustrated, and it is contemplated that other modifications and applications will occur to those skilled in the art. It is, therefore, intended that the appended claims shall cover such modifications and applications that do not depart from the true spirit and scope of the invention.

I claim:

1. A fastener insert with a floating replacable nut comprising in combination a cylindrical housing defining a nut receiving chamber with an open end and an opposite end, the housing adapted to be cast into parent material and having an exterior with means to prevent rotation and pull out with respect to the parent material, said chamber having a continuous inwardly extending raceway shoulder adjacent the opposite end of the housing and a retaining ring groove adjacent at its open end and three or more inwardly projecting lands along the innermediate portion of its length, said lands formed with concave inward faces defining a restricted opening in said chamber between upper and lower ends of said lands and said lands spaced with respect to each other to define keyways therebetween, the lower end of said lands and the raceway shoulder defining a raceway between them, a removably insertable nut having a substantially cylindrical nut body and a threaded interior for receiving a screw, said nut body having a body diameter smaller than the restricted opening of the housing and extended at its lower end with integral tabs shaped and spaced to easily enter into and slide along said keyways into said raceway, said tabs rotatable within the raceway if not restrained, said nut retained in said chamber by rotating the nut until the tabs underlie the lower ends of the lands, a straight shank non-resilient retainer removably insertable in said chamber, said retainer including an annular plate portion with depending leg segments inserted into said keyways and extending into said raceway between said nut tabs to prevent the nut from being rotated into alignment with said keyways, the annular plate portion of said retainer when inserted sitting immediately inwardly of said retaining ring groove, a retaining ring positioned in said retaining ring groove to prevent removal of said retainer, said nut body having a height corresponding to the length of the lands such that a nut body is almost entirely within the restricted opening of the chamber when the nut tabs are in said raceway and the outer end of said body lies adjacent the upper end of said lands, and said nut body and tabs proportioned with respect to said raceway, housing, and restricted opening to provide clearances to allow the nut to freely move transversely in any direction for a limited distance with respect to longitudinal axis of the housing whereby said nut is freely floatable while being held captive to the housing.

* * * * *